US007564966B2

(12) United States Patent
Sano

(10) Patent No.: US 7,564,966 B2
(45) Date of Patent: Jul. 21, 2009

(54) RECOGNITION OF AUDIO DEVICE IN PORTABLE TERMINAL

(75) Inventor: Akihiro Sano, Kawasaki (JP)

(73) Assignee: Nec Infrontia Corporation, Kawasaki-Shi (JP)

( * ) Notice: Subject to any disclaimer, the term of this patent is extended or adjusted under 35 U.S.C. 154(b) by 436 days.

(21) Appl. No.: 11/605,268

(22) Filed: Nov. 29, 2006

(65) Prior Publication Data

US 2007/0164861 A1 Jul. 19, 2007

(30) Foreign Application Priority Data

Dec. 27, 2005 (JP) ............................ 2005-374988

(51) Int. Cl.

*H04M 1/00* (2006.01)
*H04M 9/00* (2006.01)
*H04R 1/10* (2006.01)
*H04R 25/00* (2006.01)

(52) U.S. Cl. ......................... 379/419; 381/74; 381/384; 455/569.1

(58) Field of Classification Search ................. 379/419; 340/146.2; 381/74, 370, 384; 455/73, 550.1, 455/569.1; 439/222, 669

See application file for complete search history.

(56) References Cited

U.S. PATENT DOCUMENTS

2004/0080440 A1 * 4/2004 Su et al. ..................... 341/141
2004/0137960 A1 * 7/2004 Chung ..................... 455/569.2
2006/0182047 A1 * 8/2006 Ibe ............................ 370/260

FOREIGN PATENT DOCUMENTS

JP 9-148861 6/1997
JP 11-162574 6/1999
JP 2000-32339 1/2000
JP 2002-141980 5/2002

* cited by examiner

*Primary Examiner*—Tuan D Nguyen
(74) *Attorney, Agent, or Firm*—Young & Thompson

(57) ABSTRACT

A portable terminal includes a jack interface for connecting an audio device thereto, a converter for converting an impedance of each of the poles, that correspond to a LEFT, RIGHT channel, and MIDDLE channel of a plug of an audio device, connected to the jack interface, to a voltage value in order to deliver the respective voltage values, a first comparator for comparing the voltage value, converted from the impedance of the pole corresponding to the LEFT channel, a second comparator for comparing the voltage value, converted from the impedance of the pole corresponding to the RIGHT channel, a third comparator for comparing the voltage value, converted from the impedance of the pole that corresponds to the MIDDLE channel, and a controller for recognizing the type of audio device connected to the jack interface based on a combination of the comparison results supplied from the first to third comparators, respectively.

6 Claims, 8 Drawing Sheets

Fig. 2

| | headphone | earphone/microphone | stereo microphone | earphone/microphone having two input channels |
|---|---|---|---|---|
| LEFT channel | <speaker output><br>R1(Ω) = 200Ω or less<br>(approximately<br>8 ~ 150Ω) | <microphone input><br>R1(Ω) = ∞<br>(approximately<br>10 kΩ or more) | <microphone input><br>R1(Ω) = ∞<br>(approximately<br>10 kΩ or more) | <microphone input><br>R1(Ω) = ∞<br>(approximately<br>10 kΩ or more) |
| RIGHT channel | <speaker output><br>R2(Ω) = 200Ω or less<br>(approximately<br>8 ~ 150Ω) | <speaker output><br>R2(Ω) = 200Ω or less<br>(approximately<br>8 ~ 150Ω) | <microphone input><br>R2(Ω) = ∞<br>(approximately<br>10 kΩ or more) | <speaker output><br>R2(Ω) = 200Ω or less<br>(approximately<br>8 ~ 150Ω) |
| MIDDLE channel | 0 (Ω)<br>(GND) | 0 (Ω)<br>(GND) | 0 (Ω)<br>(GND) | <microphone input><br>R3(Ω) = ∞<br>(approximately<br>10 kΩ or more) |

RECOGNITION OF AUDIO DEVICE IN PORTABLE TERMINAL

This application is based upon and claims the benefit of priority from Japanese Patent Application No. 2005-374988 filed on Dec. 27, 2005, the content of which is incorporated by reference.

BACKGROUND OF THE INVENTION

1. Field of the Invention

The present invention relates to a portable terminal which is equipped with a jack interface for connection to an audio device, and a method of recognizing an audio device in a portable terminal.

2. Description of the Related Art

Conventionally, portable terminals such as a note-type PC (personal computer), PDA (Personal Digital Assistant) and the like are equipped with a jack interface for connection to an audio device such as an external headphone, a microphone or the like.

For example, a portable terminal having a relatively large physical size such as a note-type PC can be equipped with a plurality of jack interfaces.

On the other hand, a small portable terminal such as PDA is generally equipped only with a single jack interface to enable connection only with a single audio device because the physical size limitations of the portable terminal make it difficult to include multiple jack interfaces.

In recent years, however, due to advances in multi-media functions and solution systems, even small portable terminals have been required to accommodate a plurality of audio devices, To address this requirement, research has been focused on techniques for enabling portable terminals to be equipped with only a single jack interface, in order to maintain the small size of the terminal, and which is capable of recognizing the type of an audio device that is connected to this jack interface so that the portable terminal can accommodate a plurality of different types of audio devices.

By way of example, JP-A-11-162574 (hereinafter called "Patent Document 1") discloses a technique for recognizing whether a plug of the audio device connected to a jack interface is a four-pole plug of AV or a three-pole plug of headphone.

Thus, the prior art disclosed in Patent Document 1 is capable of recognizing whether an audio device has a four-pole plug or three-pole plug.

However, since three-pole plugs are employed in a large number of types of audio devices, including a headphone, an earphone/microphone, and a stereo microphone, these audio devices cannot be strictly recognized from each other.

For this reason, the prior art disclosed in Patent Document 1 fails to adequately address the requirement that a portable terminal be able to accommodate a plurality of audio devices while maintaining its small size.

SUMMARY OF THE INVENTION

It is therefore an object of the present invention to provide a portable device which is capable of recognizing a plurality of types of audio devices, any of which is connected to a single jack interface equipped in the portable terminal for maintaining its small size, and a method of recognizing an audio device in the portable device.

To achieve the above object, a portable terminal of the present invention is characterized by comprising:

a jack interface for connecting an audio device thereto;

a converter for converting the impedance of each of the poles that correspond to a LEFT channel, a RIGHT channel, and a MIDDLE channel of a plug of an audio device, connected to the jack interface, to a voltage value in order to deliver the respective voltage values;

a first comparator for comparing the voltage value, converted from the impedance of the pole that corresponds to the LEFT channel of the plug among the voltage values delivered from the converter, with a reference voltage to deliver the result of the comparison;

a second comparator for comparing the voltage value, converted from the impedance of the pole that corresponds to the RIGHT channel of the plug among the voltage values delivered from the converter, with the reference value to deliver the result of the comparison;

a third comparator for comparing the voltage value, converted from the impedance of the pole that corresponds to the MIDDLE channel of the plug among the voltage values delivered from the converter, with the reference value to deliver the result of the comparison; and a controller for recognizing the type of the audio device connected to the jack interface based on a combination of the comparison results supplied from the first to third comparators, respectively.

According to this configuration, the type of an audio device connected to the jack interface is recognized in accordance with a combination of three comparison results generated by comparing, with a reference value, voltage values converted from the impedances of the respective poles that correspond to the LEFT channel, RIGHT channel, and MIDDLE channel of a plug connected to the jack interface.

It is therefore possible to recognize a plurality of types of audio devices (for example, a headphone, an earphone/microphone, a stereo microphone, or an earphone/microphone of the type having two input channels) connected to the jack interface.

The portable terminal may further comprise:

an audio CODEC for compressing or decompressing signals on the LEFT channel, RIGHT channel, and MIDDLE channel applied therefrom or delivered thereto through the jack interface; and a CPU connected to the audio CODEC, wherein the controller may be contained in the audio CODEC, and may deliver an interrupt signal to the CPU to acquire a set value from the CPU for the audio CODEC in accordance with the type of audio device that has been recognized.

According to this configuration, the audio CODEC can be operated at optimal set values (output volume, input gain and the like) in accordance with the type of the audio device connected to the jack interface.

The portable terminal may further comprise:

an input/output selector disposed between the jack interface and the audio CODEC to switch an input signal supplied to the audio CODEC and an output signal delivered from the audio CODEC, wherein the controller may also be contained in the input/output selector, and may also connect signal lines of signals on the LEFT channel, RIGHT channel, and MIDDLE channel applied therefrom or delivered thereto through the jack interface to a signal line of either the input signal or the output signal of the audio CODEC in accordance with the type of audio device that has been recognized.

According to this configuration, the input/output of the jack interface can be optimally switched in accordance with the type of an audio device connected to the jack interface.

The above and other objects, features, and advantages of the present invention will become apparent from the following description with reference to the accompanying drawings which illustrate examples of the present invention.

BRIEF DESCRIPTION OF THE DRAWINGS

FIG. 2 is a table showing functions of the LEFT/RIGHT/MIDDLE channels of a plug, and the impedances of respective poles that correspond to the LEFT/RIGHT/MIDDLE channels for each of the following audio devices: a headphone, an earphone/microphone, a stereo microphone, and an earphone/microphone of the type having two input channels;

DESCRIPTION OF THE PREFERRED EMBODIMENTS

Figure 1:
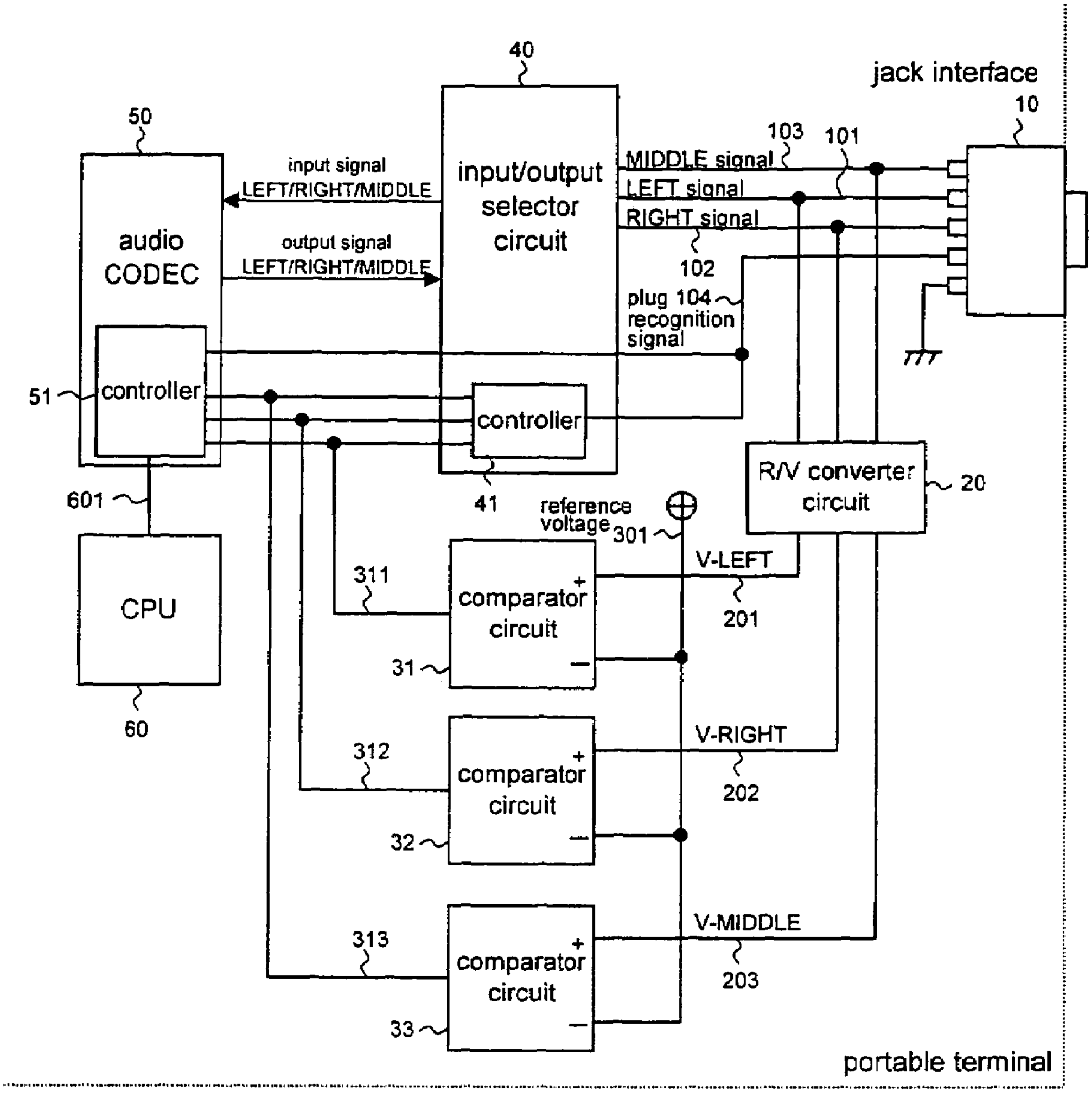
FIG. 1 is a block diagram illustrating the configuration of a portable terminal according to one embodiment of the present invention.

FIG. 1 is a block diagram illustrating the configuration of a portable terminal according to one embodiment of the present invention.

Referring to FIG. 1, the portable terminal according to this embodiment comprises jack interface 10, R/V converter circuit 20, comparator circuits 31~33, input/output selector circuit 40 including controller 41, audio CODEC 50 including controller 51, and CPU 60.

Plugs of audio devices connected to jack interface 10 include a four-pole plug other than an ordinary three-pole plug.

FIG. 2 is a table showing functions of the LEFT/RIGHT/MIDDLE channels of a plug, and the impedances of respective poles that correspond to the LEFT/RIGHT/MIDDLE channels for each of the following audio devices: a headphone, an earphone/microphone, a stereo microphone, and an earphone/microphone of the type having two input channels.

Respective poles of a four-pole plug in turn correspond to a LEFT channel, a RIGHT channel, a MIDDLE channel, and GND, respectively. As shown in FIG. 2, an earphone/microphone of the type having two input channels (for example, a headset supporting microphone of the type having two input channels and the like) has LEFT/MIDDLE channels for use in receiving inputs from a microphone, and a RIGHT channel for use in delivering an output to a speaker.

Respective poles of a three-pole plug in turn correspond to a LEFT channel, a RIGHT channel, and GND, respectively. As shown in FIG. 2, a headphone has LEFT/RIGHT channels that are both used for delivering outputs to speakers. An earphone/microphone in turn has a LEFT channel that is used for receiving an input from a microphone, and a RIGHT that is used for delivering an output to a speaker. A stereo microphone in turn has LEFT/RIGHT channels that are both used for receiving inputs from a microphone.

When the plug of an audio device is connected to jack interface 10, jack interface 10 receives or supplies LEFT signal 101 on the LEFT channel of the plug, RIGHT signal 102 on the RIGHT channel of the same, and MIDDLE signal 103 on the MIDDLE channel of the same, and supplies a plug recognition signal 104 which indicates that the plug of the audio device has been connected.

R/V converter circuit 20 applies a voltage to each of the poles of the plug connected to jack interface 10, that corresponds to the LEFT channel, RIGHT channel, and MIDDLE channel, to measure the impedance of each pole, and converts the impedances of the respective poles to voltage values V-LEFT 201, V-RIGHT 202, and V-MIDDLE 203, respectively.

Comparator circuit 31 compares V-LEFT 201 with reference voltage 301 to deliver comparison result 311. Comparator circuit 32 in turn compares V-RIGHT 202 with reference voltage 301 to deliver comparison result 312. Comparator circuit 33 compares V-MIDDLE 203 with reference voltage 301 to deliver comparison result 313.

Input/output selector circuit 40 is disposed between jack interface 10 and audio CODEC 50 to switch an input signal applied to audio CODEC 50 and an output signal delivered from audio CODEC 50.

Controller 41 of input/output selector circuit 40 is applied with plug recognition signal 104 from jack interface 10 and also with comparison results 311~313 from comparator circuits 31~33. Then, controller 41 recognizes the type of audio device connected to jack interface 10 based on comparison results 311~313. Further, controller 41 connects the signal line associated with each of LEFT signal 101, RIGHT signal 102, and MIDDLE signal 103 of jack interface 10 to either a signal line associated with an input signal applied to audio CODEC 50 or a signal line associated with an output signal delivered from audio CODEC 50.

Audio CODEC 50 compresses or decompresses signals on the LEFT channel, RIGHT channel, and MIDDLE channel applied therefrom or delivered thereto through jack interface 10.

Controller 51 of audio CODEC 50 is applied with plug recognition signal 104 from jack interface 10 and also with comparison results 311~313 from comparator circuits 31~33. Then, controller 51 recognizes the type of an audio device connected to jack interface 10 based on comparison results 311~313. Further, controller 51 delivers interrupt signal 601 to CPU 60 in order to acquire set values (output volume, input gain and the like) for software that are suitable for the type of the audio device. This interrupt signal 601 includes information on the type of audio device that has been recognized.

Upon receipt of interrupt signal 601 from controller 51, CPU 60 notifies controller 51 of optimal values for software of audio CODEC 50 that are suitable for the type of the audio device.

Controller 51 sets the values notified from CPU 60 in audio CODEC 50. Audio CODEC 50 comprises a compress encoder unit, not shown, which compresses an output signal, and a decompress decoder unit, not shown, which decompresses an input signal, respectively, in accordance with the values set by controller 51.

In the following, a description will be given of the operation of the portable terminal according to this embodiment.

Figure 3A:
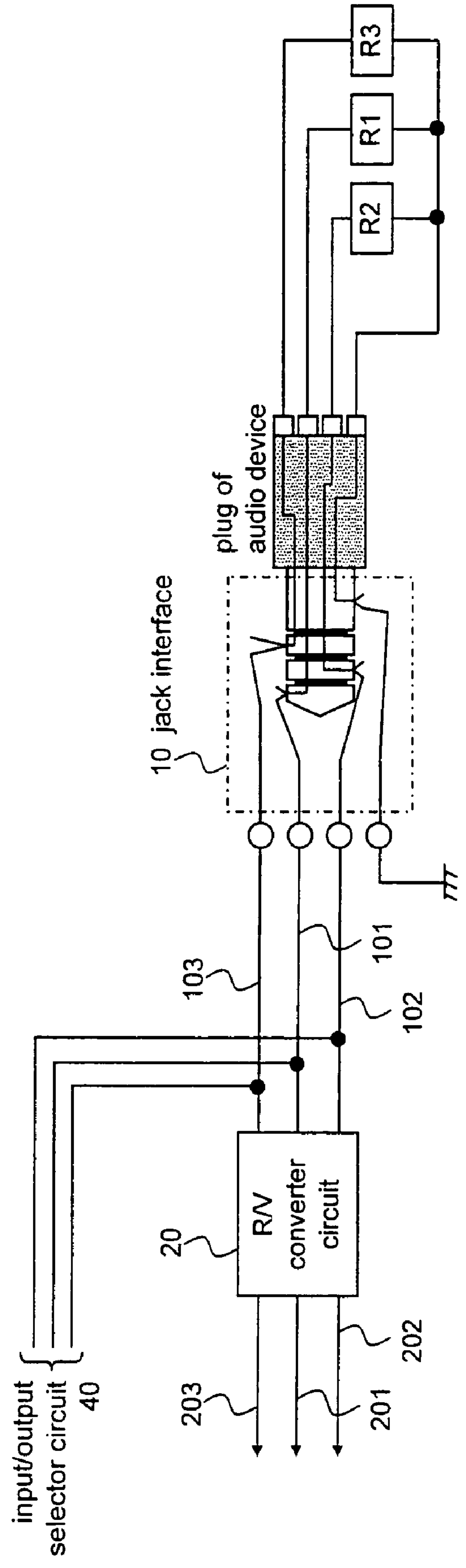
FIG. 3A is a diagram illustrating a four-pole plug connected to the jack interface shown in FIG. 1.
Figure 3B:
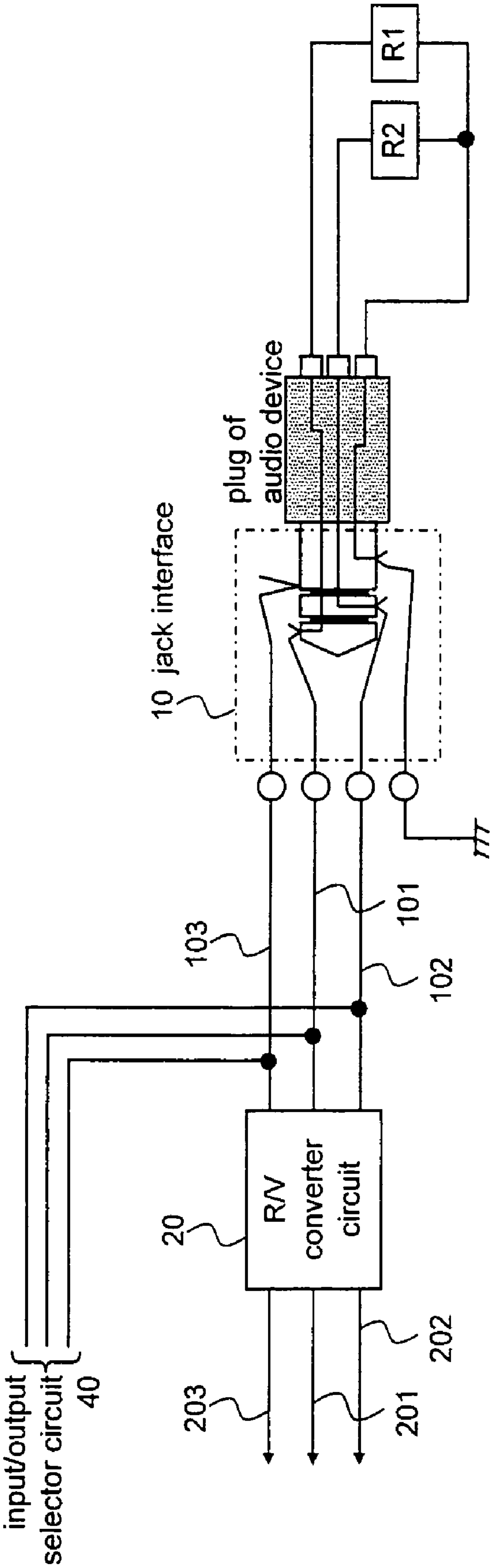
FIG. 3B is a diagram illustrating a three-pole plug connected to the jack interface shown in FIG. 1.

FIG. 3A illustrates a four-pole plug connected to jack interface 10. FIG. 3B in turn illustrates a three-pole plug connected to jack interface 10.

The plug of an audio device is connected to jack interface 10 as illustrated in FIG. 3A or 3B.

R/V converter circuit 20 applies a voltage to each of the poles of a plug connected to jack interface 10, that correspond to a LEFT channel, a RIGHT channel, and a MIDDLE channel, to measure the impedance of each pole, and converts the impedances of the respective poles to voltage values V-LEFT 201, V-RIGHT 202, and V-MIDDLE 203 which are then delivered from R/V converter circuit 20.

For example, when a four-pole plug of a headset supporting microphone of the type having two input channels is connected to jack interface 10, the impedance of the pole that correspond to the LEFT channel can be measured as resistance R1 between the LEFT channel and GND, which is approximately 10 kΩ or more, as shown in FIG. 2. Likewise, the impedance of the pole that correspond to the RIGHT channel can be measured as resistance R2 between the RIGHT channel and GND, which is approximately 8~150 Ω, as shown in FIG. 2. Also, the impedance of the pole that correspond to the MIDDLE channel can be measured as resistance R3 between the MIDDLE channel and GND, which is approximately 10 kΩ or more, as shown in FIG. 2.

On the other hand, when a three-pole plug of a headphone is connected to jack interface 10 as illustrated in FIG. 3B, the impedance of the pole that correspond to the LEFT channel can be measured as resistance R1, which is approximately 8~150Ω, as shown in FIG. 2. Likewise, the impedance of the pole that correspond to the RIGHT channel can be measured as resistance R2, which is approximately 8~150 Ω, as shown in FIG. 2. Note, however, that the three-pole plug does not have a pole that correspond to the MIDDLE channel, so that the impedance of the pole that correspond to the MIDDLE channel is measured as 0 Ω (GND). In this connection, when a three-pole plug of an earphone/microphone or a stereo microphone is connected to jack interface 10, the impedance of each pole of the plug can also be measured in a manner similar to the foregoing, resulting in values as shown in FIG. 2.

Figure 4:
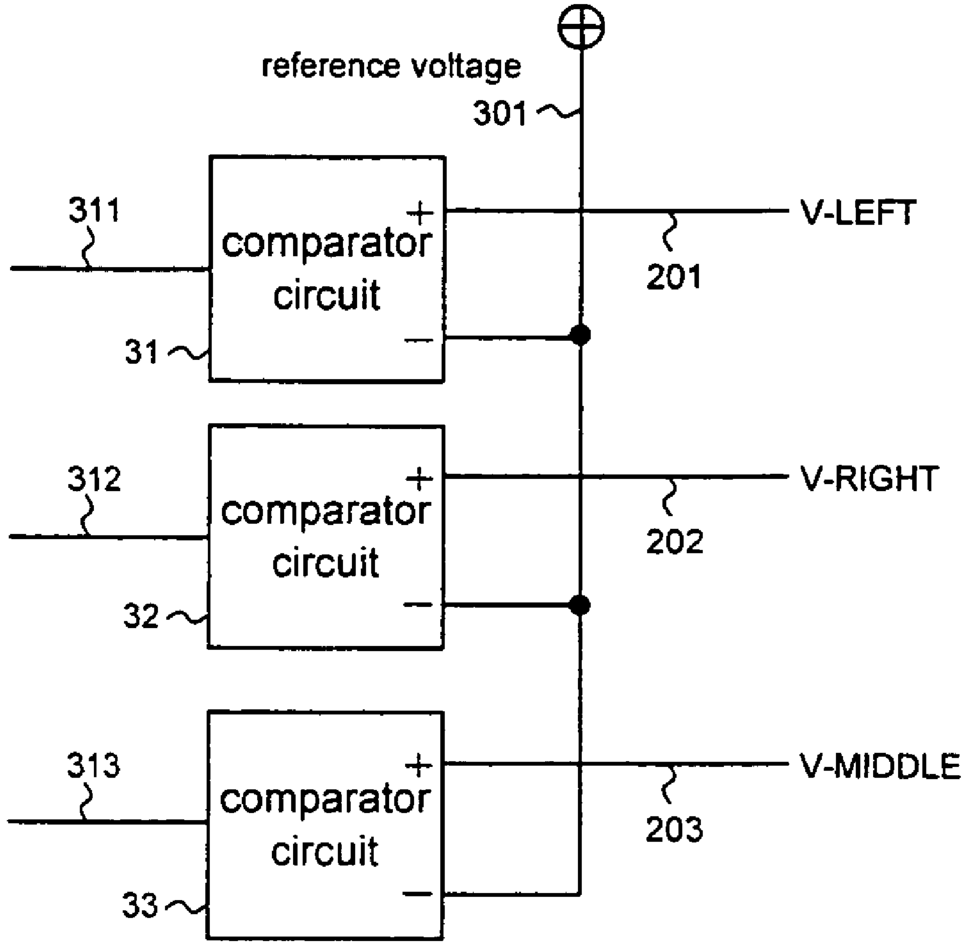
FIG. 4 is a diagram for describing the operation of comparator circuits shown in FIG. 1.

FIG. 4 is a diagram for describing the operation of comparator circuits 31~33.

V-LEFT 210, V-RIGHT 202, and V-MIDDLE 203 delivered from R/V converter circuit 20 are applied to comparator circuits 31, 32, 33, respectively, as illustrated in FIG. 4.

Each of comparator circuits 31, 32, 33 compares V-LEFT 201, V-RIGHT 202, or V-MIDDLE 203 with reference voltage 301 to deliver its comparison result 311, 312, or 313.

In this event, Comparison results 311~313 differ depending on the values of V-LEFT 201, V-RIGHT 202, and V-MIDDLE 203. Accordingly, controller 41 of input/output selector circuit 40 and controller 51 of audio CODEC 50 recognize whether an audio device connected to jack interface 10 is a headphone, an earphone/microphone, a stereo microphone, or an earphone/microphone of the type having two input channels in accordance with a combination of comparison results 311~313.

In the following, comparison operation of comparator circuits 31~33, and recognition operation of controllers 41, 51 will be described with reference to FIG. 5.

Figure 5:
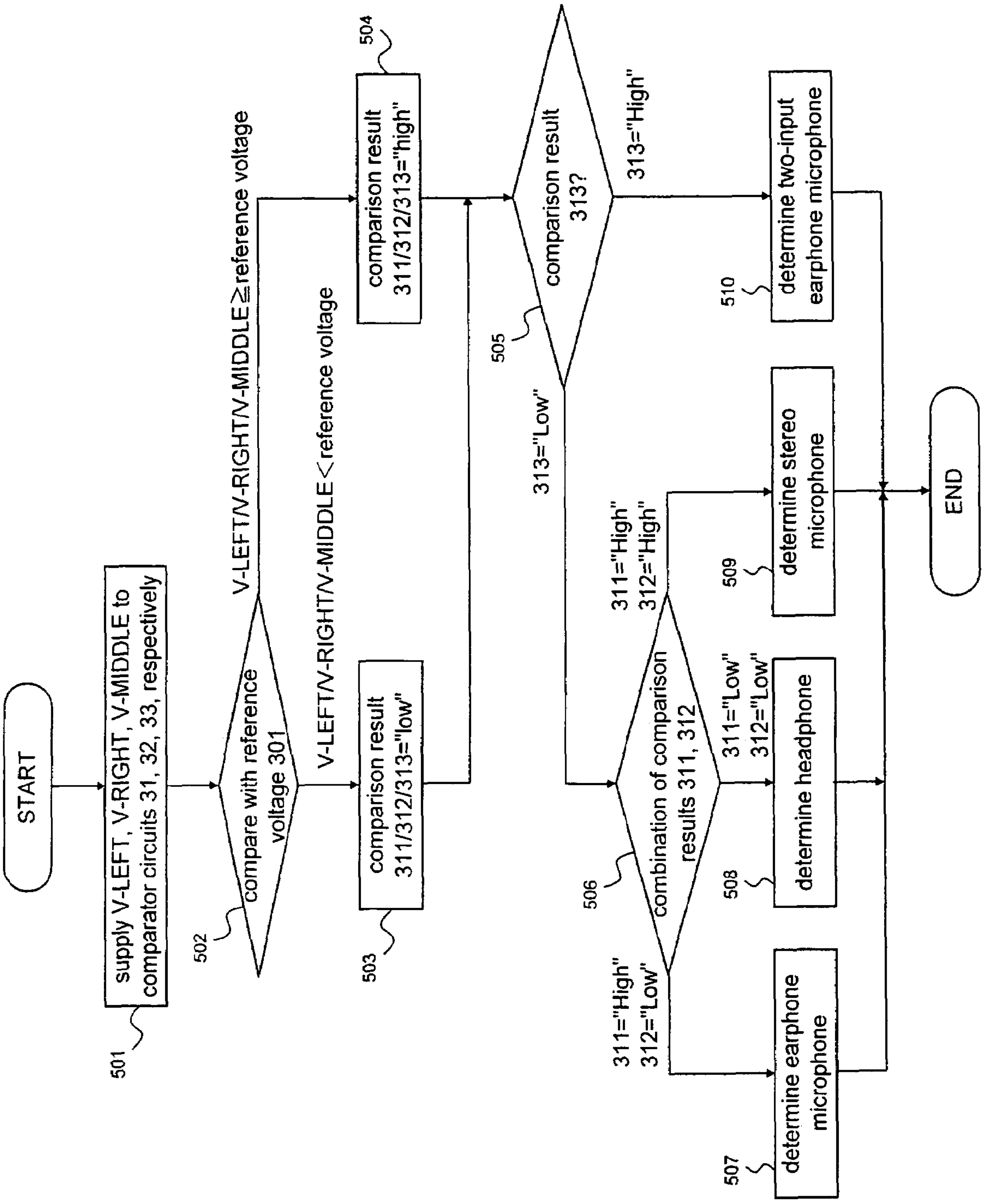
FIG. 5 is a flow chart for describing a comparison operation of the comparator circuit, and a recognition operation of a controller.

FIG. 5 is a flow chart for describing comparison operation of comparator circuits 31~33, and recognition operation of controllers 41, 51.

First, at step 501, comparator circuits 31~33 are applied with V-LEFT 201, V-RIGHT 202, and V-MIDDLE 203, supplied from R/V conversion circuit 20, respectively. Next, at step 502, comparators 31~33 each compare V-LEFT 201, V-RIGHT 202, V-MIDDLE 203 with reference voltage 301, respectively, and execute step 503 when V-LEFT 201, V-RIGHT 202, V-MIDDLE 203 is lower than reference voltage 301; and execute step 504 when V-LEFT 201, V-RIGHT 202, V-MIDDLE 203 is equal to or higher than reference voltage 301. Comparison results 311~313 delivered from comparator circuits 31~33, respectively, go to "Low" at step 503, and to "High"at step 504.

Subsequently, controllers 41, 51 each recognize the type of an audio device connected to jack interface 10 in accordance with a combination of comparison results 311~313.

First, at step 505, controller 41, 51 determines comparison result 313 supplied from comparator 33. For example, controller 41, 51 executes step 506 when comparison result 313 is "Low". On the other hand, controller 41, 51 executes step 510 to recognize an earphone/microphone of the type having two input channels when comparison result 313 is "High".

Next, at step 506, controller 41, 51 determines a combination of comparison results 311, 312 supplied from comparator circuits 31, 32. For example, controller 41, 51 executes step 507 to recognize an earphone/microphone when comparison result 311 is "High" while comparison result 312 is "Low". Controller 41, 51 executes step 508 to recognize a headphone when both comparison results 311, 312 are "Low". Further, controller 41, 51 executes step 509 to recognize a stereo microphone when both comparison results 311, 312 are "High".

Figure 6:
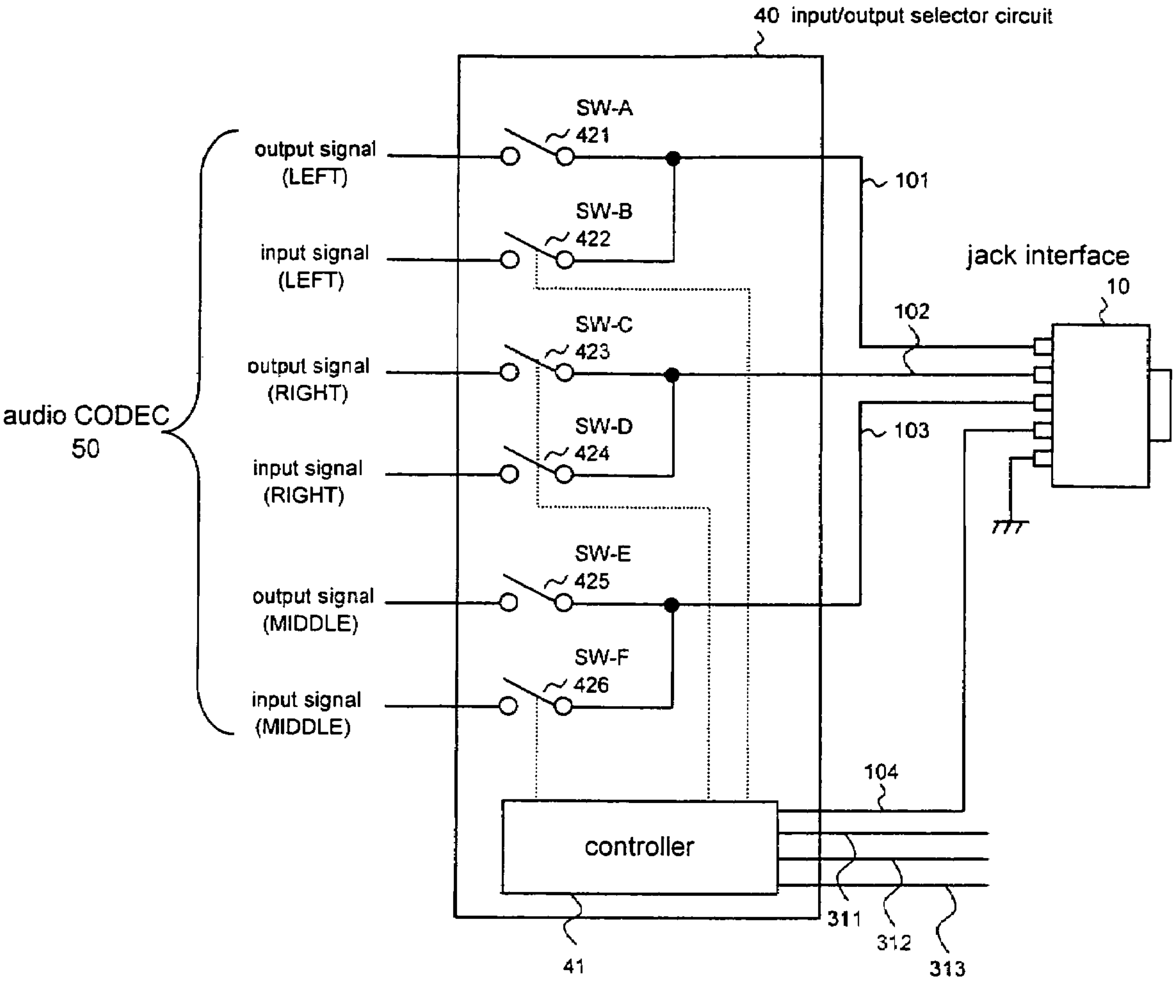
FIG. 6 is a diagram for describing the operation of an input/output selector circuit shown in FIG. 1.

FIG. 6 is a diagram for describing the operation of input/output selector 40.

As illustrated in FIG. 6, input/output selector 40 comprises, in addition to controller 41, switch SW-A 421 which is an output switch for LEFT signal 101, switch SW-B 322 which is an input switch for LEFT signal 101, switch SW-C 423 which is an output switch for RIGHT signal 102, switch SW-D 424 which is an input switch for RIGHT signal 102, switch SW-E 425 which is an output switch for MIDDLE signal 103, and switch SW-F 426 which is an input switch for MIDDLE signal 103.

Controller 41 is applied with plug recognition signal 104 to prevent a circuit malfunction when no audio device is connected.

Controller 41 is also applied with comparison results 311~313 supplied from comparator circuits 31~33, respectively, and recognizes the type of audio device connected to jack interface 10 in accordance with the combination of comparison results 311~313.

Further, upon recognition of the type of audio device connected to jack interface 10, controller 41 switches each of the aforementioned switches in accordance with the recognized type of the audio device.

For example, controller 41 turns on SW-B 422, SW-C 423, and SW-F 426, as shown in FIG. 6, when it recognizes a four-pole plug type an earphone having two input channels. Also, controller 41 turns on SW-A 421 and SW-C 423 when it recognizes that a headphone is connected to the portable terminal; turns on SW-B 422 and SW-C 423 when it recognizes that an earphone/microphone is connected to the portable terminal; and turns on SW-B 422 and SW-D 424 when it recognizes that a stereo-microphone is connected to the portable terminal.

In this way, the signal lines associated with LEFT signal 101, RIGHT signal 102, and MIDDLE signal 103 of jack interface 10 are connected to appropriate ones of signal lines associated with the output signals or input signals of audio CODEC 50.

Figure 7:
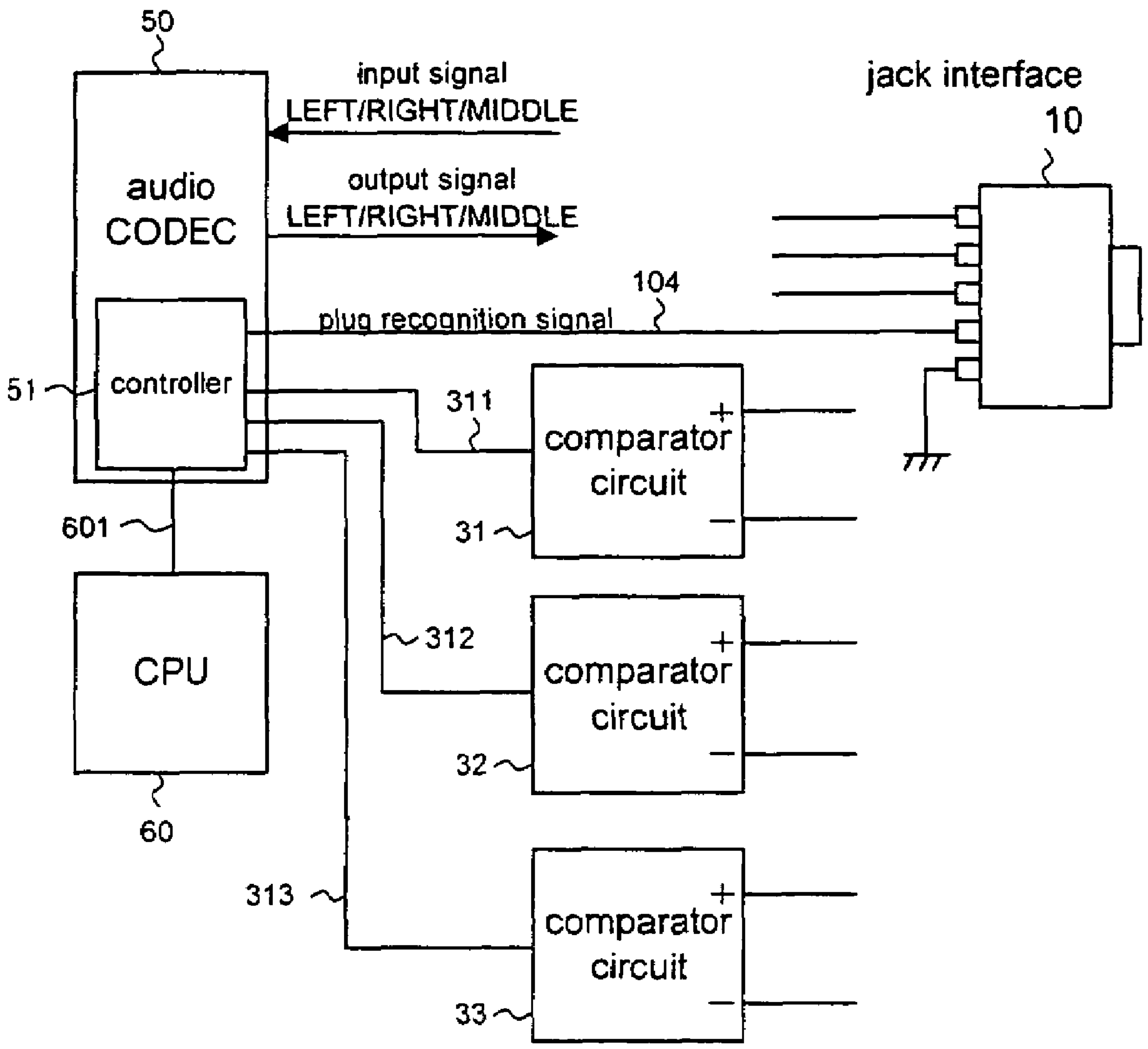
FIG. 7 is a diagram for describing the operation of an audio CODEC and a CPU shown in FIG. 1.

FIG. 7 is a diagram for describing the operation of audio CODEC 50 and CPU 60.

As illustrated in FIG. 7, controller 51 is applied with plug recognition signal 104 to prevent a circuit malfunction when no audio device is connected.

Controller 51 is also applied with comparison results 311~313 supplied from comparator circuits 31~33, respectively, and recognizes the type of an audio device connected to jack interface 10 in accordance with the combination of comparison results 311~313.

Further, after recognizing from plug recognition signal 104 that an audio device is connected, controller 51 delivers interrupt signal 601 to CPU 60 when it recognizes the type of audio device connected to jack interface 10. This interrupt signal 601 includes information on the type of audio device recognized by controller 51.

Upon generation of interrupt signal 601 from controller 51, CPU 60 notifies controller 51 of the appropriate values (output volume, input gain and the like) that have been set for software of audio CODEC 50 in accordance with the type of audio device connected to jack interface 10.

As described above, in this embodiment, the impedances of the respective channels that correspond to the LEFT channel, RIGHT channel, and MIDDLE channel of a plug connected to jack interface 10 are converted to respective voltage values which are each compared with a reference voltage to generate three comparison results. Then, the type of the audio device connected to jack interface 10 is recognized in accordance with a combination of the three comparison results.

In this way, since the portable terminal of this embodiment recognizes the type of audio device by utilizing not only the LEFT channel and RIGHT channel supported by general three-pole plugs of audio devices but also the MIDDLE channel supported by four-pole plugs, the portable terminal can adapt to both the three-pole and four-pole plugs.

Also, since the type of audio device is recognized in accordance with a combination of three comparison results, the portable terminal of this embodiment can recognize a plurality of audio devices, including a headphone, an earphone/microphone, a stereo microphone, an earphone/microphone of the type having two input channels and the like.

Accordingly, even a small sized portable terminal can provide sufficient audio functions.

Also, since the portable terminal of this embodiment automatically recognizes the type of an audio device connected to jack interface 10, and sets audio CODEC 50 in accordance with the type of audio device that has been recognized, the user is not required to manually switch the settings of audio CODEC 50. The automatic settings also help prevent an audio device from being erroneously plugged into jack interface 10, as well as help reduce the failure rate.

In this embodiment, the portable terminal automatically recognizes audio devices of the following types: a headphone, an earphone/microphone, a stereo microphone, and an earphone/microphone of the type having two input channels. The present invention, however, is not limited to these representative audio devices, but can also be applied to audio devices other than them as long as they have a microphone input function and a speaker output function.

Also, comparator circuits 31~33 differ in output level depending on whether comparator circuits 31~33 employ an inverting input configuration or a non-inverting input configuration. In any case, however, the operation of the present invention will not be affected by the configuration of comparator circuits 31~33 as long as controller 41 of input/output selector circuit 40 and controller 51 of audio CODEC 50 are logically designed to correspond to different output levels.

While preferred embodiments of the present invention have been described using specific terms, such description is for illustrative purposes only, and it is to be understood that changes and variations may be made without departing from the spirit or scope of the following claims.

What is claimed is:

1. A portable communication terminal comprising:

a jack interface for connecting an audio device thereto;

a converter for converting an impedance of each of the poles that correspond to a LEFT channel, a RIGHT channel, and a MIDDLE channel of a plug of an audio device, connected to said jack interface, to a voltage value in order to deliver the respective voltage values;

a first comparator for comparing the voltage value, converted from the impedance of the pole that corresponds to the LEFT channel of the plug among the voltage values delivered from said converter, with a reference voltage to deliver the result of the comparison;

a second comparator for comparing the voltage value, converted from the impedance of the pole that corresponds to the RIGHT channel of the plug among the voltage values delivered from said converter, with the reference value to deliver the result of the comparison;

a third comparator for comparing the voltage value, converted from the impedance of the pole that corresponds to the MIDDLE channel of the plug among the voltage values delivered from said converter, with the reference value to deliver the result of the comparison; and a controller for recognizing the type of the audio device connected to said jack interface based on a combination of the comparison results supplied from said first to third comparators, respectively.

2. The portable communication terminal according to claim 1, further comprising:

an audio CODEC for compressing or decompressing signals on the LEFT channel, RIGHT channel, and MIDDLE channel applied therefrom or delivered thereto through said jack interface; and a CPU connected to said audio CODEC, wherein said controller is contained in said audio CODEC, and delivers an interrupt signal to said CPU to acquire a set value from said CPU for said audio CODEC in accordance with the type of the audio device that has been recognized.

3. The portable communication terminal according to claim 2, further comprising:

an input/output selector disposed between said jack interface and said audio CODEC for switching an input signal supplied to said audio CODEC and an output signal delivered from said audio CODEC, wherein said controller is also contained in said input/output selector, and connects signal lines of signals on the LEFT channel, RIGHT channel, and MIDDLE channel, applied therefrom or delivered thereto through said jack interface, to a signal line of either the input signal or the output signal of said audio CODEC in accordance with the type of the audio device that has been recognized.

4. The portable communication terminal according to claim 1, wherein either a headphone, an earphone/microphone, a stereo microphone, or an earphone/microphone of the type having two input channels is connected to said jack interface.

5. In a portable communication terminal comprising a jack interface for connecting an audio device thereto, a method for recognizing the type of an audio device connected to said jack interface, said method comprising:

a conversion step for converting an impedance of each of the poles that correspond to a LEFT channel, a RIGHT channel, and a MIDDLE channel of a plug of an audio device, connected to said jack interface, to a voltage value;

a first comparison step for comparing the voltage value, converted from the impedance of the pole that corresponds to the LEFT channel of the plug among the converted voltage values, with a reference voltage;

a second comparison step for comparing the voltage value, converted from the impedance of the pole that corresponds to the RIGHT channel of the plug among the converted voltage values, with the reference value;

a third comparison step for comparing the voltage value, converted from the impedance of the pole that corresponds to the MIDDLE channel of the plug among the converted voltage values, with the reference value; and a recognition step for recognizing the type of the audio device connected to said jack interface based on a combination of the respective comparison results at said first to third comparison steps.

6. The method according to claim 5, wherein either a headphone, an earphone/microphone, a stereo microphone, or an earphone/microphone of the type having two input channels is connected to said jack interface.

* * * * *